Nov. 15, 1960  C. F. SPITZER  2,960,613
NON-LINEAR RESONANCE DEVICES
Filed May 12, 1955  2 Sheets-Sheet 1

INVENTOR:
CHARLES F. SPITZER,
BY George V. Eltgroth
HIS ATTORNEY.

Nov. 15, 1960  C. F. SPITZER  2,960,613
NON-LINEAR RESONANCE DEVICES
Filed May 12, 1955  2 Sheets-Sheet 2

INVENTOR:
CHARLES F. SPITZER.
BY George V Eltgroth
HIS ATTORNEY.

United States Patent Office 2,960,613
Patented Nov. 15, 1960

2,960,613

NON-LINEAR RESONANCE DEVICES

Charles F. Spitzer, Syracuse, N.Y., assignor to General Electric Company, a corporation of New York Filed May 12, 1955, Ser. No. 507,848

5 Claims. (Cl. 307—88)

This invention relates to electrical apparatus and, more specifically, to electrical circuits of the class called variously trigger, gate, or flip-flop circuits. Still more particularly, my invention relates to circuits of the class described, in which a non-linear resonance characteristic is obtained by the use of non-linear capacitance elements or both non-linear inductance and capacitance elements. That is to say, inductive elements may be employed in which the flux-current relationship is non-linear, and capacitive elements are employed in which the charge-voltage relationship is non-linear.

For various purposes such as counting, computation, and control, circuit elements having two stable electrical states are needed. These circuit elements, which may be termed trigger, gate, or flip-flop circuits, should be such as to change their electrical condition from one stable state to the other stable state, or from a stable state to a dynamically stable state and thence back to the stable state, when actuated or triggered by an input signal of a predetermined type such as a pulse of certain magnitude or duration. Circuits employing electronic tubes have been used for these purposes, but have a number of disadvantages such as fragility, expense, and high power consumption. These disadvantages are particularly serious in certain devices for military purposes and in large computing machines employing a great many of such circuit elements.

It has been found possible to circumvent some of the the difficulties inherent in electronic-tube flip-flop circuits by employing in their place some circuit elements including non-linear inductances and depending for their operation upon the phenomenon known as non-linear resonance or ferroresonance. Such a circuit element is disclosed and claimed in Patent 2,653,254—Spitzer and Reich, which is entitled "Non-Linear Resonant Flip-Flop Circuit" and is assigned to the assignee of the present invention. The circuit of this patent employs a pair of parallel-connected branches, each of which includes a capacitor and a non-linear inductor, the pair of branches being in turn connected through an impedance to a power source. While the circuit of the patent is satisfactory for many applications, it is desirable to obtain certain improvements thereon in such properties as stability and triggering sensitivity in order to increase the reliability and usefulness of the circuit.

Accordingly, it is an object of my invention to provide an improved non-linear resonance device having the best possible stability and sensitivity characteristics.

It is a further object of my invention to provide an improved non-linear resonance device suitable for use as a trigger, gate, or flip-flop circuit and capable of being actuated from one state to the other by a small input signal.

Briefly, these objects are fulfilled by a non-linear resonance device in which are incorporated at least one capacitance element having a non-linear relationship between its charge and the voltage across it, or alternatively, a non-linear resonance device in which are incorporated both one or more capacitance elements having a non-linear relationship between their charge and voltage and one or more inductances having a non-linear relationship between their magnetic flux and their current. In other words, the device of my invention incorporates at least one capacitance element in which the dielectric "constant" varies with voltage, or employs at least one such capacitance element together with at least one inductance element in which the magnetic permeability varies with the current. Still another way to describe the device of my invention is to say that it includes at least one variable-capacitance element, or at least one such variable-capacitance element together with at least one variable-inductance element. Any desired arrangements may be made for triggering the device and deriving therefrom one or more output voltages.

For additional object and advantages, and for a better understanding of my invention, attention is now directed to the following description and accompanying drawings. The features of the invention which are believed to be novel are particularly pointed out in the appended claims.

Figure 1:
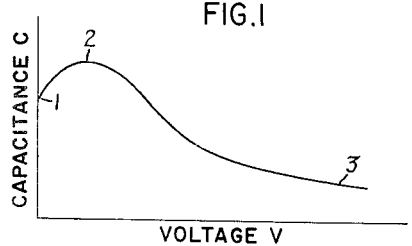
Figure 1 shows the variation of capacitance with voltage in capacitors suitable for use in resonance devices of my invention.
Figure 2:
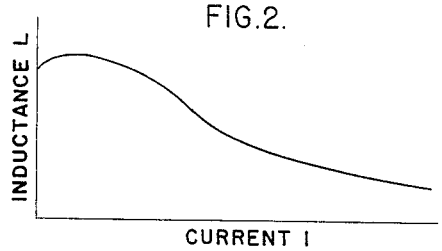
Figure 2 shows the variation of inductance with current in inductors suitable for use in the resonance devices of my invention.

In the embodiments of my invention shown in the above-listed figures, it will be noted that the capacitors have solid dielectric materials and that the inductors have solid cores. It has been found that certain dielectric materials such as barium titanate have characteristics such that capacitors employing these materials vary in capacitance depending upon the magnitude of the voltage applied thereto. This class of materials has been termed "ferroelectric" because of the resemblance which a plot of electric displacement versus electric gradient for such materials bears to the familiar plot of magnetic flux density versus magnetizing force for ferromagnetic materials. The class of ferroelectric materials includes lead niobate $(Pb(NbO_3)_2)$, strontium titanate, and lead titanate as well as barium titanate, and may include mixtures of these substances under certain conditions. A typical variation of capacitance with voltage is illustrated by the curve of Figure 1, which shows an increase of capacitance from point 1 to point 2, followed by a decrease of capacitance from point 2 to point 3. With regard to the inductors in the circuit, on the other hand, the curve of Figure 2 shows that there are certain core materials which permit the inductance to vary as the current through the inductor increases, such inductance variation being somewhat analogous to the capacitance variation of Figure 1. Such materials include iron, under certain conditions, and also the materials known as "ferrites," which are mixtures of various prescribed portions of metallic oxides. One particular "ferrite" which I have found to be well suited for this service comprises iron oxide ($Fe_2O_3$), nickel oxide (NiO), zinc oxide (ZnO), and vanadium oxide $V_2O_5$, and may be prepared as described in Snoek, J. L., New Developments in Ferromagnetic Materials, With Introductory Chapters on the Statics and Dynamics of Ferromagnetism, Elsevier Publishing Company, 1947, or in Albers-Schoenberg, Ferrites for Microwave Circuits and Digital Computers," Journal of Applied Physics, volume 25, Number 2, pages 152–154, February 1954.

It will be noted further that, while the resonance devices of my invention may employ both non-linear capacitors and non-linear inductors, it may be desired to employ non-linear capacitors but to operate the inductors with such core materials or in such current ranges that their response is substantially linear. Satisfactory resonance response may be obtained with non-linear capacitors and linear inductors, but still better response may be obtained by using both nonlinear capacitors and non-linear inductors.

Figure 3:
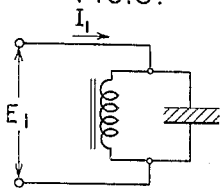
Figure 3 shows a basic parallel non-linear circuit which may be made resonant.
Figure 4:
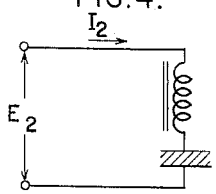
Figure 4 shows a basic series non-linear circuit which may be made resonant.
Figure 5:
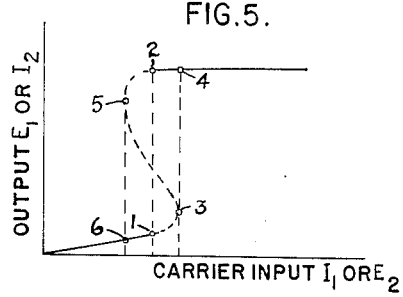
Figure 5 shows the input-versus-output characteristics of circuits of the type of either Figure 3 or Figure 4.

In Figure 3 is shown a simple parallel circuit comprising inductance and capacitance. If either or both of the elements are non-linear, and the input voltage $E_1$ is suitable, this circuit is capable of displaying the phenomenon known as non-linear resonance or ferroresonance, which is considered to be well known. The phenomenon is discussed in United States Patent 1,921,788, granted to Chauncey G. Suits on August 8, 1933, and assigned to the assignee of the present invention. A typical response curve appears in Figure 5 and may represent the output of either the parallel type of circuit shown in Figure 3 or the series type of circuit shown in Figure 4. In the former case, the voltage across the parallel combination is plotted as a function of input current, while in the latter case, circuit current is plotted as a function of applied voltage. The curve of Figure 5 is not meant to be a precise representation of the characteristics of any specific circuit, but shows in a qualitative way the performance of the circuits of both Figure 3 and Figure 4. The important characteristic of the curve of Figure 5 is the negative-slope portion of the curve between points 3 and 5 which implies instability between those points. This characteristic signifies further that, for fixed carrier input, a suitably introduced trigger signal will cause the output to jump abruptly from point 1 to point 2 or from point 3 to point 4, with a sharp increase of voltage across the parallel combination of Figure 3 and a sharp increase of current through the series combination of Figure 4.

Figure 8:
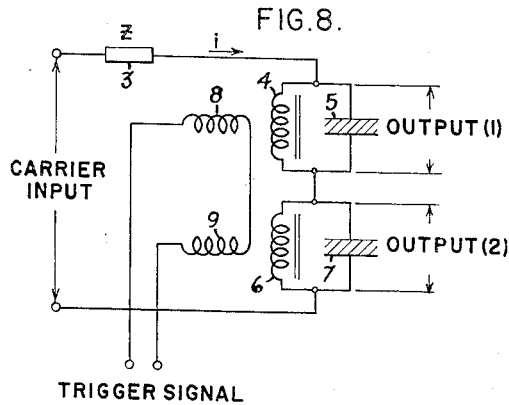
Figure 8 shows a specific embodiment of my invention having provision for a carrier wave, a trigger-signal input, and a pair of signal outputs.
Figure 9:
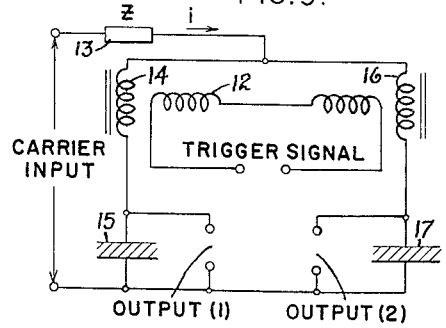
Figure 9 shows another specific embodiment of my invention in which a parallel arrangement of series circuits has been substituted for a series arrangement of parallel circuits.

It is apparent that the transition from point 1 to point 2 or point 3 to point 4 on the operating curve is a snap or trigger action, and it is this snap or trigger action of the circuit characterized by non-linear resonance which makes possible the construction of a flip-flop device. Snap action in the reverse sense occurs with the transition from point 2 to point 1, or from point 5 to the corresponding lower ordinate intercept on the lower part of the operating curve, designated as point 6. Now, besides changing the impressed voltage or current, there are other ways in which the snap or trigger action of the circuit may be induced. Such action may be brought about by injection of energy into the circuit as by changing the voltage across the capacitor or by inducing a change of current in the inductor, and conversely for reverse action by extraction of energy through similar means. The latter change may, of course, be performed by using one winding of a transformer as the inductor, and coupling the "trigger" signal into the circuit through another winding. In this regard, if it is desired not to have appreciable feedback from the ferroresonant circuit into the trigger-input circuit, any inductive coupling between the two circuits should be very loose. In the embodiments of Figure 8 and Figure 9, this loose coupling has been indicated by drawing the trigger windings perpendicular to the windings of the circuit inductors.

Turning to a more detailed discussion of trigger-signal injection, it may be mentioned that, if the resonance device employed happens to be one in which the only non-linearity is in the capacitor or capacitors, a trigger signal may still be injected by induction into the inductive element or elements of the device because changing the inductor current and voltage will result in a change of capacitor voltage if the carrier input current or voltage is fixed. On the other hand, if it is desired to inject the trigger signal into the non-linear capacitor or capacitors of the device, such injection may be facilitated by splitting the capacitors as shown in Figure 6 and Figure 7.

Figure 6:
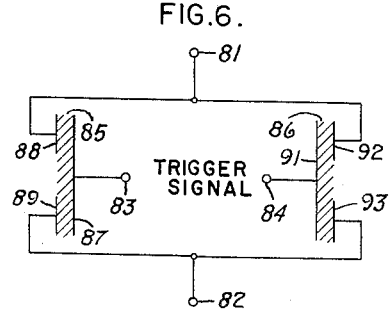
Figure 6 shows a way in which circuit capacitors may be split to permit introduction of a trigger signal into the circuit.
Figure 7:
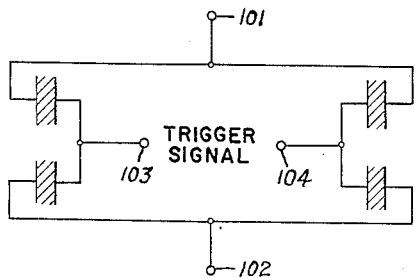
Figure 7 shows another way in which circuit capacitors may be split to permit introduction of a trigger signal into the circuit.

In Figure 6 is shown a capacitor assembly which may be substituted for any non-linear capacitor as shown in the other illustrative figures of the drawing. It will be seen to comprise a network resembling an electrical bridge such that the equivalent capacitor appears between a pair of terminals 81 and 82, while the trigger signal is applied between a pair of terminals 83 and 84. Whereas, in a conventional capacitor, the solid dielectric is monolithic, the capacitor assembly of Figure 6 employs at least two slabs of dielectric, of which one is designated by the numeral 85, while another is designated by the numeral 86. An electrode 87 adjacent to one face of dielectric slab 85 is conductively connected to terminal 83, while two electrodes 88 and 89 adjacent to another face of dielectric slab 85 are conductively connected respectively to terminals 81 and 82. An electrode 91 adjacent to one face of dielectric slab 86 is conductively connected to terminal 84, while two electrodes 92 and 93 adjacent to another face of dielectric slab 86 are conductively connected respectively to terminals 81 and 82. As shown in Figure 6, electrodes 88 and 92 may be directly connected to each other in a conductive manner as well as to terminal 81. Similarly, electrodes 89 and 93 may be directly connected to each other in a conductive manner as well as to terminal 82.

It will be understood that various modifications can be made in capacitor-assembly design in order to permit triggering to be accomplished in various ways and to permit the dielectric material to take desired physical forms. For instance, the assembly may take the form of the embodiment of Figure 7, in which four slabs of dielectric material are employed, rather than two slabs as in the configuration of Figure 6. In the configuration of Figure 7, the bridge form is more apparent than in the configuration of Figure 6. In Figure 7, the equivalent capacitor appears between a pair of terminals 101 and 102, while the trigger signal is applied between a pair of terminals 103 and 104. Each of the four dielectric slabs has two electrodes respectively adjacent to two of its faces in such a way as to form four capacitor sub-assemblies, and the capacitor sub-assemblies are respectively connected between terminal pairs 101 and 103, 102 and 103, 102 and 104, and 101 and 104.

Such splitting of the capacitor into a bridge type of arrangement makes it possible to change the electric flux density, electric displacement, or polarization and, hence, the dielectric "constant" of the dielectric material without permitting the capacitor element to react significantly upon the trigger-input circuit. It will, of course, be understood that the capacitor configurations of Figure 6 and Figure 7 are illustrative only, and that any arrangement for introduction of trigger energy into the resonance device is within the contemplation of my invention.

Turning now to Figure 8, an embodiment of my complete invention will be explained. It will be seen that the embodiment comprises in series an impedance 3, a parallel inductance-capacitance circuit 4, 5, and another parallel inductance-capacitance circuit 6, 7, together with trigger windings 8 and 9 for injection of a trigger signal into inductances 4 and 6, respectively. The carrier input to the series circuit should be from a constant-voltage source, of proper magnitude, in series with a properly proportioned small impedance, but alternatively may be from an equivalent combination of a constant-current source in parallel with an impedance. If the magnitudes of the carrier source impedance and of the impedance 3 are such that the input voltage is relatively constant in effective value, any random disturbance in one of the non-linear circuit elements (capacitors or inductors, if both non-linear capacitors and non-linear inductors are used) will cause a small change in the magitude of the capacitance or inductance in question. Any small increase in voltage across capacitor 5, for instance, will cause the capacitance to decrease, thereby increasing the capacitive reactance. Since the parallel inductance-capacitance circuit was originally predominately capacitive, the increase of capacitive reactance moves the circuit toward the resonant voltage peak, thereby tending to increase the current through the inductance of that particular circuit. As the current through the inductance increases by virtue of the resonant voltage peak across the parallel circuit, the magnitude of the inductance tends to decrease if a non-linear inductor is used, thus augmenting the tendency of the circuit to shift toward the resonant voltage peak. This process is a cumulative one, and if the inductive reactance originally exceeded the capacitive reactance, the process proceeds so rapidly until the capacitive and inductive reactances are essentially equal that the circuit may be said to have "snapped" into resonance. If only the capacitive element is non-linear, the resonant state will be reached, but perhaps not quite so rapidly as in the case where both the inductance and capacitance elements are non-linear. With resonance of one parallel inductance-capacitance circuit, the voltage aross that circuit becomes maximized but, since a relatively constant effective value of total input voltage was assumed, the voltage across the other parallel inductance-capacitance circuit necessarily becomes minimized, thus producing one high output voltage and one low output voltage.

The explanation of the approach to resonance as outlined in the paragraph supra has assumed a random voltage disturbance as the initiating event. Now, in the resonance devices of my invention, it is desired that the approach to resonance and the departure from resonance be controllable. Such control may be exerted by coupling an initial trigger signal into the device through trigger windings 8 and 9. The parameters of the circuit must be such that only one of the series-connected parallel circuits can be in resonance at a time. The satisfaction of this requirement will be facilitated if the carrier input to the circuit of Figure 8 is a relatively constant-voltage source.

In the configuration of Figure 8, the output voltages are taken across capacitors 5 and 7 respectively. It will be apparent that the voltage across the one of the parallel circuits which is resonant will be comparatively high, while the voltage across the one of the parallel circuits which is not resonant will be comparatively low. By triggering the device so that the parallel circuit which was resonant becomes non-resonant and the parallel circuit which was non-resonant becomes resonant, it is apparent that, assuming similar circuits, each of the respective output voltages assumes the magnitude which formerly characterized the other output voltage. This repeated exchange of output voltage magnitudes every time a trigger signal is applied constitutes the flip-flop action which is desired. In other words, the device has two stable states, each of which may be triggered into the other by the application of a trigger signal. It is important to note that the symmetry of the device permits the change of state to take place in either direction with equal ease.

With regard to the type of trigger signal which is necessary in order to have a shift from one stable state to the other, it is necessary also to consider the nature and magnitude of the carrier wave applied to the device. If the carrier wave is sinusoidal, it is desirable that the trigger signal be synchronized in such a way as to add to the peak values of the carrier at a time when the sum of the trigger signal and the carrier peak will be so poled as to induce the desired change of inductance or capacitance or both. In other words, if the frequency of the carrier wave is moderate and the time of application of the trigger signal is properly chosen, it may be possible to trigger the device from one stable state to the other by the application of only a very brief pulse of trigger energy. On the other hand, if the carrier frequency is high, or if no attempt at synchronization is made, the trigger signal may have to be applied during a full cycle of the carrier. In such a case, it will be obvious that the polarity of the trigger signal makes little or no difference. In this regard, it is interesting to note that, under some conditions, the same trigger signal may be used to change the device from a first stable state to a second stable state as from the second stable state back to the first stable state.

Turning to the embodiment of Figure 9, it will be seen that a parallel combination of series circuits has been utilized, rather than the series combination of parallel circuits shown in Figure 8. An inductor 14, which may or may not be non-linear, is connected in series with non-linear capacitor 15, and connected in parallel with a similar series branch including the inductor 16 and capacitor 17. A trigger winding 12 is loosely coupled to inductor 14, and another winding of this character is coupled to inductor 16, said triggering windings being connected in series between trigger input terminals. Energy is supplied to the parallel composite branches from a suitable source of periodic energy in series with impedance 13. Output connections are made respectively across capacitors 15, 17. The operation of this configuration may be most easily explained if the carrier wave is considered to be derived from a source of current of constant effective value such that sufficient current to maintain resonance in one parallel branch only at a time can be drawn. A series impedance 13 is provided so that drawing through it sufficient current to maintain resonance in both parallel branches would reduce the voltage across the parallel branches below the value necessary to maintain resonance in either parallel branch. That is to say, the circuit parameters are such that one parallel branch or the other can be resonant, but not both branches at one time. The carrier input together with the impedance 13 may be considered to constitute a relatively constant-current source.

The operation of the embodiment of Figure 9 may be further explained as follows. When a positive trigger signal is induced in an inductor 14, for instance, by trigger winding 12, the inductor current increases, thereby lowering the inductance and the inductive impedance if a non-linear inductor is used. Since the supply current is relatively fixed, the current in inductor 14 increases at the expense of the current flowing in the branch containing inductor 16 and capacitor 17. As the current increases in the branch containing inductor 14 and capacitor 15, the voltage across capacitor 15 tends to increase. As a result, the capacitance of capacitor 15 decreases, and the branch tends toward resonance as the capacitor voltage represents a larger and larger percentage of the branch voltage. It is seen that the nature of the branch containing inductor 14 and capacitor 15, when approaching resonance, is such that the more current the branch draws, the more it tends to draw, thereby reducing the current available to the other parallel branch, containing inductor 16 and capacitor 17. Thus, it will be seen that when one branch starts to "flip" to the high-current state, the other branch necessarily starts to "flop" to the low-current state. When another trigger signal of appropriate magnitude and duration is applied to the device, the reverse action takes place, thereby completing a flip-flop cycle. The output voltages may be taken across the respective capacitors 15 and 17 as shown, or might alternatively be taken across the respective inductors 14 and 16. If it is desired to use a capacitor assembly of the type of Figure 6 in the circuit configuration of Figure 9, such an arrangement may be achieved by removing capacitors 15 and 17 from the configuration of Figure 9, connecting terminal 82 of the capacitor assembly to the carrier input, breaking the direct connection between electrodes 88 and 92, connecting electrode 88 to inductor 14, and connecting electrode 92 to inductor 16.

The explanation of non-linear resonance which has been set forth in the paragraphs above is only a qualitative one. While differential equations expressive of the circuit behavior can be written, exact solution of the equations is extremely difficult because of the non-linear quantities involved. Because of the cumbersome nature of such mathematical analysis and because only a qualitative discussion is required in order to permit construction and operation of the device of my invention, no attempt will be made in this specification to set forth and solve the differential equations describing each circuit embodiment.

While, for the purposes of my invention, suitable capacitor characteristics can be obtained by using barium titanate as the dielectric material, it is not to be inferred that there are no other suitable non-linear dielectric materials. For instance, strontium titanate or lead titanate or mixtures of these compounds or of one of the compounds with barium titanate may likewise be utilized to obtain the desired ferroelectric properties. These compounds are commercially available in powder form and may be mixed with a suitable binder such as paraffin and then fired at a temperature of approximately 1300 degrees F. to make a durable dielectric wafer.

While the "ferrites" are suggested as suitable for non-linear-inductance core materials, it is not to be inferred that there are no other non-linear core materials suitable for use in the resonance devices of my invention. Alternatively, as has been pointed out, inductors of linear characteristics may be utilized with satisfactory results if the capacitor dielectric materials are non-linear with voltage.

Figure 10:
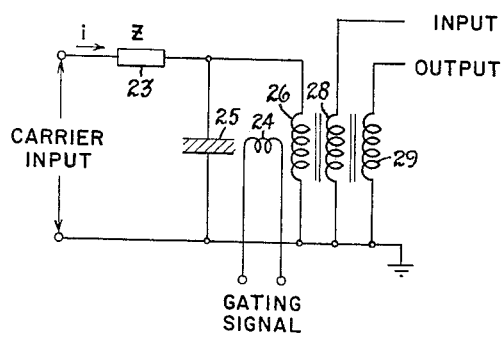
Figure 10 shows a third specific embodiment of my invention, in which only one capacitor is required.

Turning now to the embodiment of Figure 10, there is illustrated a gating system which depends upon a transition to or from resonance of a non-linear circuit. The non-linear circuit is seen to comprise the parallel combination of a non-linear capacitor 25 and a non-linear inductor 26, and an impedance 23 in series with the parallel combination. If a gating pulse is injected into the circuit through a winding 24 which is loosely coupled to non-linear inductor 26, a state of resonance existing in the parallel circuit can be destroyed, whereby the current flowing in inductor 26 decreases to an extent such that the core thereof is no longer saturated. Inasmuch as the magnetic circuit carrying the winding of inductor 26 also carries an input-signal winding 28 and an output winding 29, the desaturation of the magnetic circuit results in the input signal being coupled from winding 28 into winding 29, which windings were previously decoupled from each other by virtue of the saturated mutual core. When the gating pulse ends, the non-linear circuit again becomes resonant, resaturating the mutual core and decoupling winding 28 from winding 29. The circuit parameters and pulse polarity may be selected in such a way that, when the gating pulse is applied to the input winding 24, the state of resonance in the parallel circuit will be destroyed, and a voltage will be induced in output winding 29. Alternatively, the parameters may be selected in such a way that, when the gating pulse is applied, a state of resonance will be established, thereby decoupling winding 28 from winding 29 and causing no voltage to be induced in winding 29.

Figure 11:
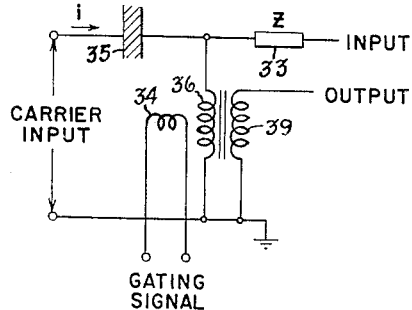
Figure 11 shows a fourth specific embodiment of my invention, in which again only one capacitor is required and in which the inductive element is simplified.

A similar gating circuit is shown in Figure 11, wherein the series combination of a non-linear capacitor 35 and a non-linear inductor 36 may be induced to resonate or removed from a state of resonance, by a gating pulse applied to the circuit through a winding 34, coupled loosely to non-linear inductor 36. When the circuit resonates, the current flowing in inductor 36 increases to such an extent that the magnetic core saturates and permits no signal to be induced in an output winding 39, coupled to winding 36. That is to say, saturation of the magnetic core decouples output winding 39 from inductor 36 and, hence, from an input signal which reaches inductor 36 through an impedance 33 connected in series therewith. Once again, the circuit parameters may be selected in such a way that, when the gating pulse is applied, the state of resonance will be either established or destroyed, whereby the output signal in winding 39 will be either eliminated or established. As in the configuration of Figure 10, both the capacitor and the inductor should be non-linear.

Figure 12:
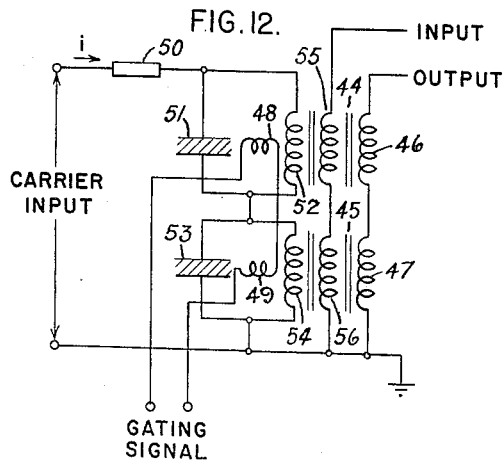
Fig. 12 shows a fifth specific embodiment of my invention which is a variation on the embodiment of Figure 8.

The configuration of Figure 12 is a phase-switching circuit which bears some similarity to the flip-flop of Figure 8 but which provides for reversing the phase of a total output signal induced in the series combination of a winding 46 and a winding 47 rather than for interchanging the magnitudes of two output signals. Just as in the configuration of Figure 8, there are in the configuration of Figure 12 two non-linear tank circuits connected in series and supplied from a relatively constant-voltage source such that only one of the tank circuits can resonate at a time.

Specifically, the configuration of Figure 12 includes, in series with the source of carrier oscillations, an impedance 50, a parallel combination of a non-linear capacitor 51 and a non-linear inductor 52, and a parallel combination of a non-linear capacitor 53 and a non-linear inductor 54. Coupled loosely to inductor 52 is a switching winding 48, while coupled loosely to inductor 54 is a switching winding 49, where switching windings 48 and 49 may be connected in series with each other and with a source of gating signals. The input signal may be coupled into the device by means of an input winding 55 linked magnetically on a core 44 with inductor 52 and with an output winding 46. Further coupling of the input signal into the device is accomplished by means of an input winding 56 linked magnetically on a core 45 with inductor 54 and with an output winding 47. Input windings 55 and 56 can be connected in series with each other and with the source of input signals, while output windings 46 and 47 can be connected in series with each other and with any desired output circuit. By introducing a switching signal into the series combination of switching winding 48 and switching winding 49, either core 44 or core 45 may be saturated. Of course, the winding directions of winding 48 and winding 49 should be such that a given switching pulse applied to the two windings in series will urge one magnetic core toward saturation, thereby bringing about coupling between the input and output windings on the unsaturated core and decoupling between the input and output windings on the saturated core. By designing output windings 46 and 47 so that a given input signal will tend to induce outputs of opposite polarity therein, a phase-switching effect is obtained by virtue of the fact that only one of those output windings at a time will have a substantial voltage induced therein, and the phase of this voltage may be established by choice of which core is unsaturated.

Figure 13:
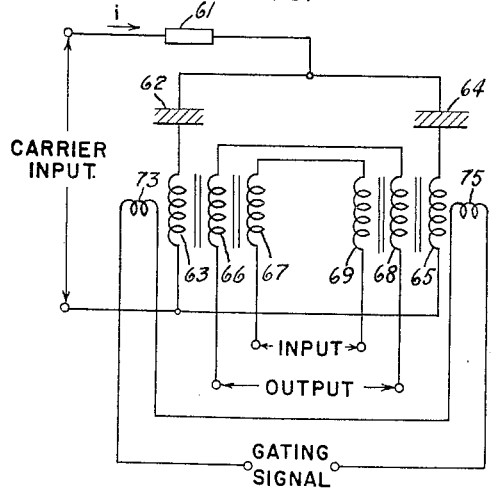
Figure 13 shows a sixth specific embodiment of my invention, which is a variation on the embodiment of Figure 9.

The embodiment of Figure 13 is a gating circuit somewhat similar in outlines to the flip-flop of Figure 9, except that the output voltage is taken by inductive coupling to the inductors of the circuit instead of by two direct taps across the respective capacitors of the circuit, and more importantly, a change in the state of the circuit may be induced by establishing resonance in one circuit and destroying resonance in another circuit. As in the embodiment of Figure 12, this effect can be obtained by pulsing a pair of series-connected windings, one of which tends to establish resonance in a first circuit branch. In contrast to the embodiment of Figure 12, however, the circuits of Figure 13 which exchange resonance states are a parallel pair of series circuits, rather than a series pair of parallel circuits as appeared in the configuration of Figure 12. Thus, the phase-switching effect obtained by the configuration of Figure 13 is similar to that obtained by the configuration of Figure 12, but the arrangement of components therein is different. Specifically, the configuration of Figure 13 includes, in series with the source of carrier oscillations, an impedance 61 and a parallel combination of two branches. A first one of said branches includes a non-linear capacitor 62 and a non-linear inductor 63, while a second one of said branches includes a non-linear capacitor 64 and a non-linear inductor 65. By means of a common core, inductor 63 is magnetically linked with an inductor 66 and an inductor 67, while by means of another common core, inductor 65 is magnetically linked with an inductor 68 and an inductor 69. Inductors 67 and 69 may be connected in series with each other and with a source of input signals. Inductors 66 and 68 may be connected in series with each other and with an output circuit. A source of gating signals may be connected to the device by means of a series-connected pair of windings which may be loosely coupled respectively to inductors 63 and 65. A winding 73 is shown loosely coupled to inductor 63, while a winding 75 is shown loosely coupled to inductor 65. As was previously pointed out, the connection of windings 73 and 75 should be such that a gate or pulse applied to the series connection of those windings always tends to establish resonance in one of the two parallel branches.

The specific embodiments which have been shown and discussed in the paragraphs supra were chosen to illustrate the principles of my invention. As is well known to those skilled in the art, the array, disposition, number and character of the circuit elements may be varied to meet particular operating or environmental requirements without departing from the essence of the invention. For instance, although Figures 8 through 13 have shown trigger windings for introducing the trigger energy into the circuits in question, it will readily be understood that an equivalent effect might be obtained by causing a properly directed powerful bar magnet to approach the inductor to be triggered. It is intended to cover in the appended claims such equivalents within the scope of my invention.

What I claim as new and desire to secure by Letters Patent of the United States is:

1. A resonant device comprising a voltage source having impedance, an inductive reactance element and a capacitive reactance element in circuit relationship with said source, said capacitive element including a dielectric material for which the ratio of electric flux density to electric gradient is not constant with changing electric gradient, said inductive element including a core material for which the ratio of magnetomotive force to magnetic induction is not constant with changing magnetomotive force applied thereto, said reactive elements being connected to form a multi-stable state resonant circuit energized by said source, means to transfer said resonant circuit from one state to another, means providing an output indicative of said state, said inductive element and said capacitive element forming a parallel combination in series circuit relationship with said source.

2. A resonance device comprising a voltage source having impedance, a first parallel combination of an inductance element and a capacitance element, and a second parallel combination of an inductance element and a capacitance element, said source being connected in series-circuit relationship with said first and second parallel combinations, and said capacitance elements including a dielectric material for which the ratio of electric flux density to electric gradient is not constant with changing electric gradient, said inductance elements including a core material for which the ratio of magnetic induction to magnetomotive force is not constant with changing magnetomotive force applied thereto, means to transfer said first and second parallel combinations from first stable resonant states to second stable resonant states, and means providing an output indicative of said states.

3. A resonance device comprising a voltage source, at least a first and a second parallel resonant circuit connected in series circuit relationship with each other and with said source, each of said parallel resonant circuits comprising an inductive element and a capacitive element, each of said inductive elements including a core material for which the ratio of magnetic induction to magnetomotive force varies with changing magnetomotive force, each of said capacitive elements including a dielectric material of which the ratio of the electric flux density to electric gradient varies with changing, electric gradient, means comprising a coil loosely coupled to at least one of said inductive elements for applying a trigger signal to said inductive element, and means to derive an output signal from each of said capacitive elements.

4. A resonance device gating circuit comprising, an inductive element and a capacitive element connected in circuit relationship with a source of electrical energy, said capacitive element comprising a dielectric material of which the ratio of electric flux density to electric gradient varies with changing electric gradient, said inductive element comprising a first electrical winding on a magnetically saturable core material; a second electrical winding on said core material; means to apply an input signal to the magnetic circuit of said core, means to derive an output signal from said second winding, and means comprising a coil loosely coupled to said first winding for applying a gating signal to said first winding.

5. A resonant device gating circuit comprising, first and second parallel resonant circuits connected in series circuit relationship with a source of electrical energy, each of said parallel resonant circuits comprising an inductive element and a capacitive element, each of said capacitive elements comprising a dielectric material of which the ratio of electric flux density to electric gradient varies with changing electric gradient, each of said inductive elements comprising a first electrical winding on a magnetically saturable core material, second electrical windings on said core material, means to apply an input signal to the magnetic circuit of said core material, means to derive an output signal from said second windings, and means comprising coils loosely coupled to said first windings for applying a gating signal to said first windings.

References Cited in the file of this patent

UNITED STATES PATENTS

| 2,461,307 | Antalek | Feb. 8, 1949 |
| 2,473,556 | Wiley | June 21, 1949 |
| 2,526,207 | Donley et al. | Oct. 17, 1950 |

(Other references on following page)

UNITED STATES PATENTS

| | | |
|---|---|---|
| 2,653,254 | Spitzer et al. | Sept. 22, 1953 |
| 2,695,398 | Anderson | Nov. 23, 1954 |
| 2,697,178 | Isborn | Dec. 14, 1954 |
| 2,709,757 | Triest | May 31, 1955 |
| 2,773,198 | Duinker | Dec. 4, 1956 |
| 2,785,390 | Rauchman | Mar. 12, 1957 |
| 2,795,706 | Barker | June 11, 1957 |
| 2,815,488 | Von Neumann | Dec. 3, 1957 |
| 2,869,111 | Young | Jan. 13, 1959 |

OTHER REFERENCES

Massachusetts Institute of Technology, Digital Computer Laboratory Report R-212, Dudley A. Buck, June 5, 1952 (Fig. 25C, 1 pg.).